(12) United States Patent
Carter

(10) Patent No.: US 6,896,177 B2
(45) Date of Patent: May 24, 2005

(54) METHOD AND COMPUTER PROGRAM FOR BUILDING AND REPLENISHING CASH DRAWERS WITH COINS

(75) Inventor: Odie Kenneth Carter, Naples, FL (US)

(73) Assignee: Balance Innovations, LLC, Lenexa, KS (US)

( * ) Notice: Subject to any disclaimer, the term of this patent is extended or adjusted under 35 U.S.C. 154(b) by 476 days.

(21) Appl. No.: 09/832,509

(22) Filed: Apr. 11, 2001

(65) Prior Publication Data

US 2002/0152141 A1 Oct. 17, 2002

(51) Int. Cl.[7] .................................................. G07G 1/00
(52) U.S. Cl. ........................ 235/7 R; 453/58; 705/16; 705/30; 705/28
(58) Field of Search ................ 705/16–25, 30

(56) References Cited

U.S. PATENT DOCUMENTS

| | | | |
|---|---|---|---|
| 4,319,326 A | | 3/1982 | Uchida |
| 4,447,885 A | | 5/1984 | Biss |
| 4,495,627 A | * | 1/1985 | Nishimura ..................... 377/6 |
| 4,512,428 A | | 4/1985 | Bullivant |
| 4,522,275 A | | 6/1985 | Anderson |
| 4,532,641 A | * | 7/1985 | Nishimura ..................... 377/14 |
| 4,674,060 A | | 6/1987 | Larkin et al. |
| 4,682,288 A | * | 7/1987 | Taipale et al. ................ 705/16 |
| 5,193,629 A | | 3/1993 | Lare |
| 5,227,966 A | | 7/1993 | Ichiba |
| 5,366,404 A | | 11/1994 | Jones |
| 5,396,417 A | | 3/1995 | Burks et al. |
| 5,756,977 A | * | 5/1998 | Biss ............................ 235/7 R |
| 5,813,510 A | * | 9/1998 | Rademacher ................ 194/206 |
| 5,913,399 A | * | 6/1999 | Takemoto et al. .......... 194/200 |
| 5,943,655 A | * | 8/1999 | Jacobson ...................... 705/30 |
| 5,954,576 A | * | 9/1999 | Coulter et al. ................ 453/17 |
| 6,067,530 A | * | 5/2000 | Brooks et al. ................ 705/30 |
| 6,196,913 B1 | * | 3/2001 | Geib et al. .................... 453/10 |
| 6,328,149 B1 | * | 12/2001 | Blad et al. ................... 194/217 |
| 6,772,941 B1 | * | 8/2004 | Carter ........................ 235/7 R |

FOREIGN PATENT DOCUMENTS

| | | | | |
|---|---|---|---|---|
| FR | 2586840 A | * | 3/1987 | |
| GB | 2269088 A | * | 2/1994 | |
| JP | 404023096 A | * | 1/1992 | ................. 235/7 A |
| JP | 404088496 A | * | 3/1992 | |

OTHER PUBLICATIONS

"Managing the cash drawer becomes a weighty issue for Wesson", c–storedecisions.com, 2004.*
AND MC–2000 Money Counting Scale, Itin Scale Company, www.itinscales.com/and_mc_money_counting_scale.htm, 1998.*
"Twenty–first Century Inn System", Procedures Manual, volue IV: Front Office System Training, 1993.*

\* cited by examiner

*Primary Examiner*—Steven B. McAllister
(74) *Attorney, Agent, or Firm*—Spencer Fane Britt & Browne LLP

(57) ABSTRACT

A revenue balancing method and computer program that more quickly, accurately, and easily reconciles or balances revenue contained in cash drawers at the end of cashiers' shifts or breaks while at the same time building or constructing new cash drawers for new shifts. The method permits cash drawers to be constructed and/or replenished with coins from a perpetual inventory of loose coins rather than requiring the use of rolls of coins.

2 Claims, 1 Drawing Sheet

US 6,896,177 B2

METHOD AND COMPUTER PROGRAM FOR BUILDING AND REPLENISHING CASH DRAWERS WITH COINS

BACKGROUND OF THE INVENTION

1. Field of the Invention

The present invention relates to the construction, reconciliation and balancing of cash register cash drawers or tills. The invention also relates to a method and computer program for building and replenishing cash drawers with loose coins rather than rolls of coins.

2. Description of the Prior Art

Grocery stores and other retail and wholesale establishments use cash registers to ring up sales and collect money from customers. Cash drawers or tills from these cash registers must be regularly reconciled or balanced at the end of shifts to ensure that the money in the cash drawers matches sales figures for the cash registers. Cash drawers must also be rebuilt or constructed in preparation for cashiers starting new shifts.

Most stores typically balance and construct cash drawers with back office accounting personnel who manually remove and count the money from cash drawers after cashiers' shifts have ended and manually count and add money to new cash drawers. Those skilled in the art will appreciate that such manual methods of balancing and constructing cash drawers are very time consuming and often lead to miscounting errors. For large stores that regularly balance and construct many cash drawers every day, the costs associated with such cash drawer balancing and construction can be substantial.

Systems and methods that automate some aspects of cash drawer balancing and construction have been developed. However, these systems and methods still require accounting personnel to manually perform many of the steps required to balance and build cash drawers and therefore are still time consuming and prone to miscounting errors.

Another problem with prior art systems and methods of cash drawer balancing and reconciliation is the need to repeatedly perform pick-ups (the removal of excess cash from cash drawers for security reasons), loans (the addition of extra cash into cash drawers for change-making purposes), and/or the purchase of additional change by cashiers. Pick-ups, loans, and change purchasing procedures typically involve several employees and therefore use a considerable amount of labor, especially for large stores.

Another problem with prior art systems and methods of cash drawer balancing and reconciliation is they use rolled coins to construct or rebuild cash drawers with an adequate amount of coins to make change. The use of rolled coins is undesirable for several reasons. First, rolled coins are expensive and/or require a great deal of labor to obtain. If rolled coins are purchased from banks, a fee of 3¢–10¢ for each roll is typically charged because banks must purchase and operate expensive automated coin sorting machines to sort, count, and roll the coins prior to purchase. These charges can be significant for stores that have many cash registers and therefore need a large and steady supply of rolled coins. Stores may also obtain rolled coins by emptying, sorting, counting, and rolling coins from store-owned or serviced vending machines, coin-operated copiers, and other coin-operated equipment. Although this saves the fees charged by banks for rolled coins, these procedures are very labor intensive. Second, rolls of coins are difficult to open, especially when wrapped in newer-type plastic sleeves, resulting in increased labor costs when adding coins to cash drawers. Third, once rolls of coins are unwrapped and placed into cash drawers, they must typically be manually recounted when the cash drawers are balanced.

SUMMARY OF THE INVENTION

The present invention solves the above-described problems and provides a distinct advance in the art of cash drawer reconciliation and construction systems and methods. More particularly, the present invention provides a revenue balancing method and computer program that more quickly, accurately, and easily reconciles or balances revenue contained in cash drawers at the end of cashiers' shifts or breaks while at the same time building or constructing new cash drawers for new shifts. The present invention also effectively eliminates the need for pick-ups, loans, and purchasing of change, eliminates the need to use rolled coins to construct or rebuild cash drawers, and eliminates the need to re-roll coins.

In one preferred embodiment of the method of the present invention, an inventory of loose coins is created and maintained. The inventory may be created from bags of loose coins purchased from a bank, loose coins retrieved from a vending machine or coin redemption system (CRS) machines, loose coins removed from cash drawers at the end of shifts, or any combination of these sources. An initial value of the loose coins in the inventory is determined and stored in a computing device. When a cash drawer is ready to be constructed or replenished, coins are removed from the inventory and placed in the cash drawer. The value of loose coins removed from the inventory and an updated value of the loose coins remaining in the inventory is determined and stored in the computing device so as to maintain an accurate, on-going count of the value of the loose coins in the inventory, thus creating a "perpetual inventory." The value of loose coins removed from the inventory and placed in the cash drawer is preferably automatically determined by a computer program that receives weight signals from a scale on which the cash drawer is placed.

As cash drawers are constructed in this fashion, the inventory of loose coins may be replenished from any of the sources described above so that the inventory of loose coins is maintained at a minimum level. Ideally, sources of loose coins for the inventory are selected so that the inventory may remain within certain acceptable ranges without requiring a store to continually purchase additional loose coins from a bank.

By constructing and using a perpetual inventory of loose coins to balance, construct, and replenish coins in cash drawers, a store will no longer need to purchase rolls of coins from banks, unwrap the rolls of coins, sort, count, and re-wrap excess coins. The perpetual inventory of loose coins also permits stores to quickly and accurately track the quantity of loose coins in inventory so as to maintain an adequate supply of loose coins for use in constructing and replenishing cash drawers without purchasing an excess supply of coins.

The above-described method is preferably incorporated into a cash drawer balancing and reconciliation method and system. The overall method may be implemented with a computer program stored on a computer-readable media for directing operation of a computer. In one embodiment, the computer first prompts an operator to remove revenue from a first cash drawer that was used by a cashier after a break or shift and to place the revenue in or on a second, initially empty cash drawer that is placed on a weigh scale. The computer receives weight measurements from the weigh scale as revenue is placed in or on the second cash drawer, and based on these weight indications, counts the revenue as it is added to the second cash drawer.

The computer continues to prompt the operator to add revenue to the second cash drawer until target amounts of each denomination have been reached, if available from the cash drawer being counted. After the target amounts have been added, the computer prompts the operator to remove any remaining revenue from the first cash drawer and to place it on top of the second cash drawer or directly on the scale. The computer receives from the scale an indication of the weight of the remaining revenue as it is placed on the weigh scale and counts this remaining revenue based on the weight indication.

Finally, the computer calculates a total amount of revenue that was removed from the first cash drawer based on the weighing of the revenue and reconciles or balances the total amount of revenue that was removed with sales information received from the cash register or a point-of-sale system interfaced to the revenue balancing system. The computer program may then prompt the operator to add additional revenue to the second cash drawer from another source if the first cash drawer did not contain enough of the required denominations to meet the target amounts. For example, the computer program may prompt the operator to remove coins from the perpetual inventory of loose coins and place the coins into the second cash drawer to reach certain target amounts for all the different denominations of coins.

The present invention is faster, more accurate, and easier to use than prior art methods and systems because revenue is weighed and automatically counted by a computer rather than manually counted by accounting personnel. The present invention also permits an operator to simultaneously reconcile or balance a first cash drawer after a cashier's shift or break and construct or build a second cash drawer to be used by a cashier needing a fresh till. Applicant has discovered that the present invention reduces the labor time for balancing or reconciling a cash drawer from an average of 15–45 minutes to only three minutes or less. Moreover, unlike prior art revenue balancing methods and systems, the present invention simultaneously constructs a new cash drawer during this approximate three-minute time. The elimination of rolls of coins also saves stores a considerable amount of expense, labor costs, and time.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
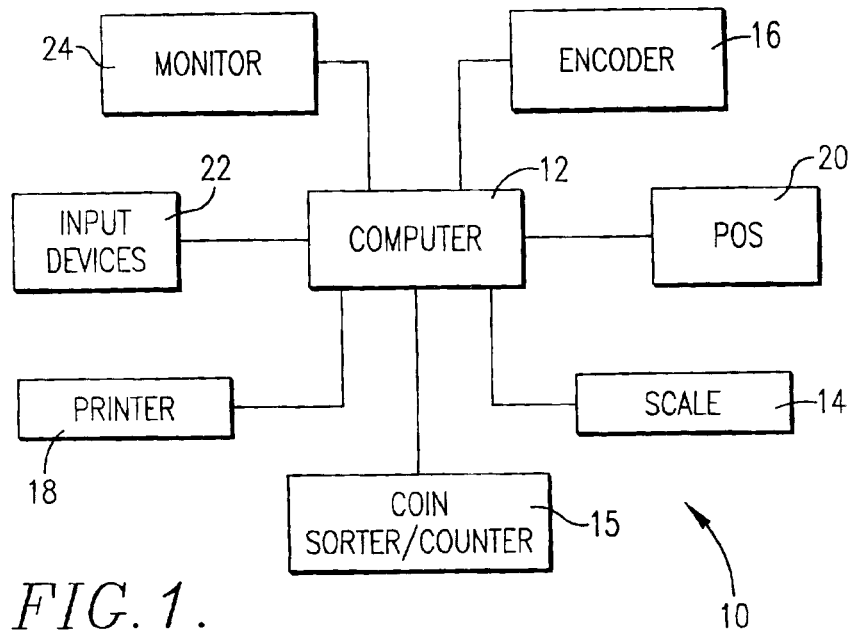
FIG. 1 is a schematic diagram of certain computer equipment that may be used to implement the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention can be used to reconcile, balance, or count any types of revenue contained in cash drawers or tills. As used herein, the term "revenue" may include paper cash, coins, checks, credit card receipts, coupons, travelers' checks, food stamps, and any other financial instruments. The term "revenue" may also include user-configurable financial instruments such as in-store coupons. The different types of revenue may also be referred to as "fields" of revenue herein. For example, the computer program of the present invention may include fields for cash, checks, and credit cards. An operator or administrator can define an unlimited number of fields of revenue and can change the nature of all fields. Each type of revenue may include different denominations. For example, paper cash revenue may include denominations of $1 bills, $5 bills, $10 bills, $20 bills, $50 bills, and $100 bills. Similarly, coins may include denominations for pennies, nickels, dimes, quarters, and dollar coins. The revenue is not limited to U.S. currencies, but may include currencies from any country's monetary system. As with the fields of revenue, the denominations may be configured by authorized management under password protection. The term "cash drawer" may include cash drawers or tills used in cash registers or any other type of drawer, holder, or enclosure that is used to hold, receive, and dispense revenue in connection with sales. As used herein, "cash drawer" and "till" are one and the same.

The present invention can be implemented in hardware, software, firmware, or a combination thereof. In a preferred embodiment, however, the invention is implemented with a computer program that operates the computer equipment broadly referred to by the numeral 10 in FIG. 1. The preferred computer equipment 10 includes a computer 12, a weigh scale 14, a coin sorting and counting machine 15, an encoder 16, a printer 18, and a point-of-sale (POS) system 20. The components of the computer equipment 10 are preferably housed in or on a metal cabinet and stand for ease of use and protection. The computer program and computer equipment 10 illustrated and described herein are merely examples of a program and equipment that may be used to implement the present invention and may be replaced with other software and computer equipment without departing from the scope of the present invention. Certain aspects of the present invention are described in more detail in a co-pending patent application entitled "Revenue Balancing Method and Computer Program", Ser. No. 09/616,401, filed Jul. 14, 2000, allowed and issued as U.S. Pat. No. 6,772,941, hereby incorporated into the present application by specific reference.

The computer 12 controls operation of and/or receives inputs from the weigh scale 14, the coin sorter 15, the encoder 16, the printer 18, and the POS system 20 in accordance with instructions from the computer program. The computer 12 may be any computing device such as an IBM compatible personal computer including those manufactured and sold by Dell, Compaq, Gateway, or any other computer manufacturer. The computer 12 preferably includes or is coupled with conventional input devices 22 such as a keyboard and a computer mouse. The computer 12 is also preferably coupled with a computer monitor 24 or screen. The preferred monitor is a flat-screen monitor such as the model number BP350 monitor sold by Sceptre.

The weigh scale 14 is coupled with the computer 12 through a serial, parallel, or Universal Serial Bus (USB) port on the computer 12 and is used for weighing revenue and providing corresponding weight signals to the computer 12 as described in more detail below. The weigh scale 14 may be any conventional scale that is capable of accurately weighing different denominations of revenue. The preferred scale is a 3000 gram scale manufactured by Ishiba Company Limited. A 6200 gram scale may be preferable to accommodate dollar coins introduced in the year 2000 and the new $5 and $10 coins expected to be issued thereafter. The scale 14 may also have a higher capacity to weigh containers of loose coins as described below.

The weigh scale 14 is operable to weigh an empty cash drawer placed thereon, revenue placed in the empty cash drawer, and containers of loose coins. The weight range of empty cash drawers can be pre-determined and stored in memory accessible by the computer 12 so that the computer program can subtract this weight from all weight measurements to determine the weight of the revenue placed in or on cash drawers placed on the weigh scale 14. All possible revenue that is to be counted with the present invention can also be weighed if the items are consistent in weight and value. The weight measurements for the different types of revenue are stored in the computer 12 or memory accessible by the computer 12 so that the computer program can distinguish between the different types of revenue that are weighed by the weigh scale 14 to count the revenue. Revenue may also be placed directly on the weigh scale 14.

The coin sorter/counter 15 is coupled with the computer 12 through a serial, parallel, or USB port on the computer 12 and may be used for sorting and counting loose coins. The coin sorter/counter may be used instead of, or with, the weigh scale 14 to count loose coins that are maintained in an inventory of loose coins as described below. An example of a coin sorter/counter that may be used with the present invention is the Jet Sort 1000 series coin sorter/counter manufactured by the Cummins/Allison Corporation.

The printer 18 is coupled with the computer 12 through a serial, parallel, or USB port on the computer 12 and is used to print various reports or tickets as described below. The printer 18 may be any conventional printing device but is preferably a high-speed thermal printer such as the model number TM-T88IIP printer manufactured by Epson.

The encoder 16 is coupled with the computer 12 through a serial, parallel, or USB port on the computer 12 and is used to encode checks received in cash drawers as described in more detail below. The preferred encoder is a model number M-406 automatic batch feed encoder manufactured by Maverick.

The POS system 20 is coupled with the computer 12 via a POS system interface. The POS system 20 communicates with the cash registers in a store and provides inputs to the computer 12 as described in more detail below. The computer 12 may interface with any POS system such as the IBM Supermarket 1, Supermarket 5.2, Ace System, or other POS systems manufacturers. Although it is preferred to couple the computer 12 with a POS system 20 as illustrated, the computer program functions without a direct connection to a POS system 20.

The computer program of the present invention is stored in or on computer-readable medium residing on or accessible by the computer 12 for instructing the computer 12 and other components of the computer equipment 10 to operate as described herein. The computer program may run in DOS, Windows, or any other operating system environment and preferably comprises an ordered listing of executable instructions for implementing logical functions in the computer 12 and any computing devices coupled with the computer 12.

The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Once the computer program is installed, it may be started with a command, such as "cash.exe". The computer program then displays an icon on the desktop of the operating system software of the computer 12. The program then goes through an initialization phase where it checks software protection keys, loads required data from the computer hard drive into memory, sets the monitor 24 display for the correct display mode, loads needed drivers for display types and fonts, and initializes the components coupled with the computer 12.

The computer program initially displays a main menu or screen on the monitor 24. The main menu may provide links to various cash balancing functions such as Loans, Pickups, Prepare Cash Deposits, and Safe Countdown. The main menu may also provide links to sub-menus such as Setup Options, Prepare Reports, Prepare Batches, and Prepare Deposits. From the Setup Options menu, an operator may configure various options and flags to their specific needs and desires as described in more detail below.

In accordance with one important aspect of the present invention, the computer program includes a routine or portion that permits an operator to simultaneously balance or reconcile a first cash drawer that has been used by a cashier and construct an initially empty second cash drawer that will be used by a cashier for a future shift. To begin a cash drawer balancing and construction process, an operator first enters an operator identification (ID) number and a cashier ID number into an ID window on the main screen. Operator ID numbers are typically assigned to accounting personnel who are authorized to balance, reconcile, and construct cash drawers. Cashier ID numbers are typically assigned to all authorized cashiers in a store. The terms "operator" and "cashier" are user-definable aspects of the program.

The computer program next prompts the operator to select the type of cash drawer that is to be constructed in the initially empty cash drawer. Unlimited numbers of different types of cash drawers may be constructed for different purposes. For example, in a grocery store, a regular cash drawer may be constructed for cashiers in regular checkout aisles and an express cash drawer may be constructed for cashiers in express checkout aisles. Because the sales made by regular cashiers and express cashiers are typically different, these two different types of cash drawers may require a different number and/or mix of denominations of revenue. For example, an express cashier may typically receive more cash payments and therefore need more coins and small bills for making change. The computer program therefore permits an operator or administrator to store different target amounts of denominations for each type of cash drawer. Target amounts may also be based on cashier numbers or even the time or date of a specific shift.

The computer program then must receive the "called for" amounts for each different type or field of revenue (i.e., cash, checks, and credit cards) in the cash drawer that is to be balanced. The "called for" amounts indicate the amount of each field of revenue that should be in the cash drawer based on sales information from the cash register. In one embodiment, the computer program prompts the operator to enter the "called for" amounts. In preferred forms, however, the "called for" amounts for each field are received automatically from the store's POS system 20.

The computer program also stores and accumulates over/short amounts for each cashier by field of revenue. Used in conjunction with the POS system 20, this accumulated total is used to compute current "called for" amounts for each field of revenue for each cashier. Thus, if an operator balances more than one cash drawer for any cashier, the "called for" amounts will only be reflective of what is expected to be in that particular cash drawer.

When the type of cash drawer that is to be constructed is selected and the "called for" amounts for the cash drawer that is to be balanced have been entered or received from the POS system 20, the computer program is ready to begin balancing the first cash drawer and constructing the second cash drawer. An operator may begin such a procedure by placing an initially empty cash drawer on the weigh scale 14. The computer program receives a weight indication from the weigh scale 14, senses that an empty cash drawer has been placed on the weigh scale 14, and displays a "new till" screen. The "new till" screen displays all possible denominations of cash in the first cash drawer and initially lists their value as "0". A first denomination of cash, for example pennies, is highlighted by the computer program.

The highlighting of the pennies row in the "new till" screen prompts the operator to remove the pennies till cup from the cash drawer that is to be balanced (first cash drawer) and to place it in the initially empty cash drawer that is to be constructed (second cash drawer). The computer program receives a weight measurement from the weigh scale 14, and based on this weight measurement, counts the number of pennies in the till cup and displays this count in an amount column of the new till screen and automatically moves the highlight bar to nickels. This process is continued for the nickels, dimes, and quarters till cups, resulting in a "new till" screen showing amounts for these coins.

The computer program performs validation of weight measurements and only accepts valid amounts. For instance, if a dime is mixed in with the quarters, the discrepancy will be caught by the computer program. The operator will be prompted to remove the till cup and the coins, then replace the empty till cup and shuffle the remaining coins into the cup, visually inspecting that only quarters are being replaced. Audio signals also notify the operator whether weights are accepted or rejected, thus improving the speed of the operation.

The computer program next automatically highlights the dollars row in the "new till" screen and lists in a target column the target amount of dollars that should be added to the second cash drawer. The target amount is retrieved from settings for the type of cash drawer that is to be constructed. For example, the target amount may be 35 $1 bills. The highlighting of the dollar row prompts the operator to remove $1 bills from the first cash drawer and to place them in the proper slot of the second cash drawer. As the dollars are placed in the second cash drawer, the computer program receives a weight measurement from the weigh scale 14, counts the $1 bills based on this weight measurement, and displays the count in the amount row of the "new till" screen. The operator should continue to add $1 bills to the second cash drawer until the target amount of $1 bills (e.g., 35) has been reached. If the first cash drawer does not contain enough $1 bills to reach the target amount, the operator should place all of the $1 bills from the first cash drawer into the second cash drawer and simply press the Enter key to continue. The computer program "remembers" how many $1 bills it still needs to meet the target amount so that these $1 bills can be added later as described below.

The computer program continues the above process for $5 bills, $10 bills, $20 bills, $50 bills, $100 bills, and any other field configured with a target amount, such as postage stamps, lottery tickets, or any other revenue. After the last target field has been removed from the first cash drawer and placed in the second cash drawer, the computer program removes the "new till" screen and displays a "denominations" screen. At this point, the computer program is ready to count any remaining revenue left in the first cash drawer that was not needed to meet the target amounts of revenue added to the second cash drawer. For example, the first cash drawer may have contained more than 35 $1 bills even though the target amount for $1 bills for the second cash drawer was 35. Although these additional $1 bills were not needed to reach the target amount of $1 bills for the second cash drawer, they still must be counted as a part of the balance of the first cash drawer. The computer program therefore instructs the operator to remove any remaining revenue from the first cash drawer and to place it on top of the second cash drawer so this remaining revenue may be counted. The operator may do so by highlighting any of the rows in the "denominations" screen and then removing revenue of this denomination from the first cash drawer and placing the revenue on top of the second cash drawer. The revenue should be placed on top of the cash drawer rather than in the cash drawer so that it may be easily removed as discussed in more detail below. The computer program receives weight measurements from the weigh scale 14 and, based on these weight measurements, counts the amount of the revenue that is added. Once all cash revenue has been removed from the first cash drawer in this manner, the computer program displays the amount of cash that has been counted, the "called for" amount for the cash from the POS system 20, and the difference. Ideally, the difference should be relatively close to zero.

Once all of the cash revenue has been transferred from the first cash drawer to the second cash drawer and counted, the operator may continue balancing the first cash drawer by counting the remaining fields of revenue such as checks, credit card receipts, etc. from the first cash drawer. The operator may enable a flag to automatically move the cursor to the non-cash fields if the cash field balances within a certain user-definable amount. Balancing of non-cash fields of revenue typically starts with checks. In one embodiment, the operator first places the checks in the encoder 16 and keys the amounts for each of the checks into the computer 12. The encoder 16 then encodes the checks for the entered amounts and adds these amounts to a field indicating the total amount of checks. This field is balanced when the displayed amount equals the "called for" amount for checks. When this field is balanced, the computer program automatically goes to the next field of revenue that is not balanced (e.g., credit card receipts). The computer program may also prompt the encoder 16 to endorse the checks for easy deposit.

In preferred forms, however, a list of checks and the amounts of the checks that should be in the first cash drawer are received directly from the POS system 20 and displayed on the screen 24 in a checks list. The computer program displays the amount of the first check that should be in the first cash drawer on the monitor 24 in a large box for easy viewing. The operator should then read the first check received in the drawer, and if its amount matches the amount displayed, the operator need only press the Enter key to encode this check for the indicated amount. If the computer monitor 24 displays a different amount, the operator should enter the correct amount for the check via one of the input devices. The operator may either navigate the checks list using the arrow keys or enter the check amount directly. The computer program then searches the list of checks received from the POS system 20 and, if it finds a check for that amount, it encodes the check.

If this amount is not found in the "called for" list of checks, a message is displayed to the operator to verify the written amount. On-screen instructions assist the operator throughout this process. If the amount was entered incorrectly by the operator, the operator presses the Escape key to return to the checks list. If the amount matches the amount written on the front of the check, the operator presses the Enter key. The operator is then prompted to remove the check from the encoder 16 and enter the amount tendered on the back of the check. If this amount is found in the checks list, the amount is replaced by the corrected amount. If the amount is not found in the list, the corrected amount is appended to the list. The operator is then prompted to drop the check into the manual feed zone of the encoder 16, which encodes the check for the correct amount.

If the operator discovers that a check was encoded for the incorrect amount while going through the checks list process, the operator may undo the last document encoded by pressing the "−" (minus) key on the keypad and then following the on-screen instructions as described above for verifying the check amount.

If it is necessary to balance another check after exiting the checks list screen, the operator may follow one of two options. First, the operator may simply type the amount of the check while the checks field is highlighted. Second, and more preferably, the operator may press the Insert key while the checks field is highlighted. The operator is prompted to enter the tendered amount of the check, then the correct amount. The operator then drops the check into the manual feed zone to be encoded.

The computer program then displays the difference of the accumulated amounts in an area devoted to checks as a memo to the operator. This display reminds the operator of the mistendered check amounts because these amounts may affect an out-of-balance condition. The computer program also displays a pop-up window listing all checks that have been mistendered. The display asks for the mistendered amount first, then the correct amount. After the correct amount is entered for a check, the computer program displays a new "difference total" which is the sum of all mistendered checks minus the sum of their mistendered amounts. Until the current correct amount is confirmed by pressing the Enter key, the operator has the opportunity to change both the correct amount and the mistendered amount.

If the encoded amount of a mistendered check is later edited as described above, the computer program will display a reminder that the check was entered as a mistendered item and will display the mistendered amount and request confirmation or reentry of that amount. Once the two amounts are confirmed, the computer program encodes the correct amount on the check as a manual feed check and lists the correct amount in the checks area of the computer screen 24.

To balance credit card receipts, the operator places the receipts on top of the weigh scale 14. The computer program receives a weight measurement from the weigh scale 14 and, based on this weight measurement, determines the number of credit card receipts. If this number matches the number of credit card receipts that were received by the cash drawer as determined from the POS system 20, the computer program proceeds to the next non-cash field of revenue. However, if the weight of the credit card receipts is incorrect, the computer program displays a list of all expected credit card receipts so that the operator may process each slip separately to determine which credit card receipts are missing. This process is similar to that of checks as described above. A credit card list is displayed and the first item is viewed in a large box on the screen 24. If the amount on the credit card slip matches the amount on the screen 24, the user simply presses the Enter key. Any missing items are revealed as individual transactions thus assisting the operator in tracking down discrepancies.

When all fields of revenue have been removed from the first cash drawer, the operator should enter "**" or any other code or sequence to indicate that the first cash drawer is now empty and the balance is acceptable. If the balance is not acceptable, the operator has the opportunity to investigate and make corrections prior to completing the balance. Note there has been no mixture of store funds with the funds of the cash drawer up to this point, thus ensuring all revenue which is accountable to that cash drawer remains separate for re-evaluation, if necessary. The computer program then prompts the operator to remove all of the excess revenue from the top of the till. This revenue should be placed in a bank or other secured place.

At this point, the first cash drawer should be balanced, but the second cash drawer may still require additional revenue from store funds to meet the target amount for one or more denominations. For example, if the target amount for $1 bills in the second cash drawer is 35 and the first cash drawer only had 30 $1 bills in it, the second cash drawer needs five additional $1 bills to meet the target amount for this denomination. If this is the case, the computer program prompts the operator to add the required denominations. The operator should place these denominations of revenue into the second cash drawer in the order displayed. As the additional revenue is added, the computer program counts the revenue based on weight measurements received from the weigh scale 14 and removes each denomination from the list as the target amounts are reached.

The present invention provides an improved method for building and replenishing cash drawers to meet the target amounts described above. Unlike prior art methods that require stores to purchase rolls of coins to fill and replenish cash drawers with coins, the present invention allows a store to use loose coins to construct and replenish cash drawers. The present invention also accurately tracks the quantity and value of all loose coins in the store. This allows a store to more quickly and accurately determine whether additional loose coins are needed from a bank.

Figure 2:
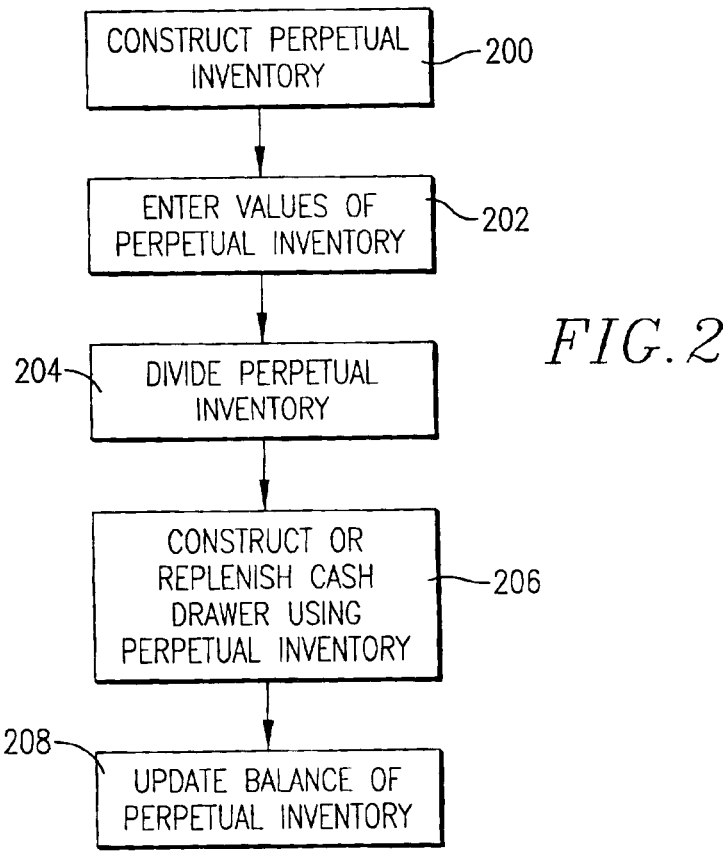
FIG. 2 is a flow diagram broadly depicting certain steps performed in a method of the present invention.

FIG. 2 depicts the primary steps of the method for building and replenishing cash drawers to meet target amounts. The steps are not necessarily performed in the order depicted, and the method may include additional steps not depicted. An initial step is to create a perpetual inventory of loose coins as depicted in box 200. The perpetual inventory should include sufficient quantities of each denomination of coins used by a store to enable the store to balance, construct and replenish all its cash drawers. Each denomination of loose coins in the perpetual inventory is preferably stored in a separate container. For example, containers may be provided for pennies, nickels, dimes, quarters, fifty cent coins, dollar coins, and five dollar coins. The particular type of containers used is not important to the present invention and may be selected as a matter of convenience.

The perpetual inventory of coins may be created from a variety of sources. For example, bulk bags of sorted and counted, but unwrapped, coins in various denominations and of various different dollar values can typically be purchased from banks. Bulk bags can usually be purchased with little or no service charge because banks don't have to roll the coins.

Loose coins may also be retrieved from vending machines owned and/or operated by a store. Many vending machines track the quantity of received coins and provide reports of these quantities. Thus, coins can be retrieved from vending machines and added to the perpetual inventory by processing them through the coin sorter/counter 15 or the weight scale 14.

Loose coins may also be retrieved from coin redemption system (CRS) machines. CRS machines are often placed in stores so that customers may bring in their loose coins and have them counted and exchanged for either paper currency or store credits. CRS machines typically track and store the value of all coins stored therein and therefore can be used to create and replenish the perpetual inventory of loose coins. Use of such CRS machines provides several advantages. First, this reduces or eliminates the need for operators of the coin sorters to drive to the machines and remove loose coins for deposit in a bank. Instead, the operators of the CRS machines will periodically collect payment from the stores for the value of coins removed from the CRS machines by the stores. Those skilled in the art will appreciate that this will save a considerable amount of money and labor for the owners of the CRS machines because coins accumulated in CRS machines must be frequently emptied by security personnel and then deposited in a bank. A second advantage is that use of the CRS machines to create and maintain the perpetual inventory may reduce or eliminate the need for a store to purchase and pick up coins from a bank.

The perpetual inventory of coins may also be created and maintained with coins received from customers and removed from cash drawers at the end of shifts. However, because stores typically give out more loose coins than they receive, this method of maintaining the perpetual inventory typically must be supplemented with one or more of the above-described methods.

Another step in the method of the present invention is to enter into the computer 12 the initial value of each denomination of coins in the perpetual inventory as depicted in step 202 of FIG. 2. The initial values may be obtained in a variety of ways. For example, if the perpetual inventory is created with bulk bags of coins bought from banks, the values of the bulk bags as determined by the bank may simply be entered into the computer. Similarly, if the perpetual inventory is created with loose coins from vending machines and/or CRS machines, the values of loose coins determined by the vending machines and/or CRS machines may be entered into the computer 12. If a store wishes to verify the value of loose coins in bulk bags, or coins retrieved from vending machines and CRS machines, the coins may be weighed on the scale 14 or counted with the coin sorter/counter 15. The value of loose coins added to the perpetual inventory to replenish it over time must also be entered into the computer 12 in a similar manner.

A next step in the method is to remove coins from each of the containers and to place them into smaller containers for convenience, if desired, as described in box 204. This step is optional, but permits a store to maintain large containers of loose coins in a safe or secured area and to place smaller quantities of coins from these containers in small containers so that they may be more easily moved to a location where cash drawer reconciliation occurs.

A next step in the method is to use the perpetual inventory and store funds to construct or replenish cash drawers with loose coins and other revenue as depicted in box 206. As described above, the computer program is preferably set up with target amounts for each denomination of revenue to be placed in a cash drawer and a target amount for the total value of the cash drawer after it has been constructed. At this point in the description of the invention, assume that the first cash drawer has been balanced and reconciled, but that the second cash drawer may still require additional revenue to meet the target amount for one or more of the revenue denominations and to meet the total target value amount. Pennies should be the first denomination of revenue added to the second cash drawer, followed by nickels, dimes, quarters, and each subsequent denomination of coins. After all denominations of coins have been added, bills, starting with $1 bills, are added in this same fashion.

Initially, an operator should visually inspect the pennies till cup and add additional pennies if it appears that more coins are needed to meet the target amount. As pennies are removed from the appropriate container of the perpetual inventory and placed into the pennies till cup, the computer 12, in conjunction with the scale 14 on which the cash drawer is placed, automatically counts the pennies and debits the value of the pennies from the perpetual inventory and adds the value to the cash drawer as depicted in step 208. If enough pennies are added to either meet or exceed the target value, the computer program automatically prompts the operator to perform the same steps for nickels. These steps are repeated for subsequent denominations of coins including dimes, quarters, etc.

It is important to note that the computer program does not require the operator to exactly reach the target values for the coins. Instead, the operator must merely meet or exceed the target values. For example, if a target value for pennies is 75 and an operator adds enough pennies so that 92 are present in the pennies till cup, the computer program automatically moves on and prompts the operator to begin adding nickels to the nickels till cup (if any are needed). Operators are therefore trained over time to add enough of each denomination of coins to the till cups in one step to exceed the target values so that additional amounts do not have to be added to meet the target values. Grabbing enough coins in one handful to meet each target value saves time when constructing a cash drawer.

Once enough coins have been added to meet the target values for all denominations of coins, the present invention provides several different routines that may be followed to obtain a selected total dollar value for the entire cash drawer. A first routine requires that an operator add a particular quantity of coins to reach an even total dollar value for the cash drawer. For example, after reaching or exceeding the target values for all denominations of coins, the computer 12 and computer program may determine that the second cash drawer needs to receive an additional 8¢ to reach an even dollar amount. The computer program therefore prompts the operator to add three pennies and one nickel. Then, once an even dollar value of coins are present in the cash drawer, the computer program prompts the operator to add a specified number of $1 bills, $5 bills, etc. to meet the target values for each of these denominations of bills and to reach the total target value for the cash drawer. This option allows the computer 12 to be set up to force an operator to arrive at a specified, even total dollar value for the cash drawer. Although this option results in an even dollar value in each cash drawer and is therefore preferred in many applications, it requires increased specificity and labor.

Another routine does not require the operator to add pennies to reach an even dollar total value for the cash drawer. For example, if the cash drawer needs to receive an additional 1¢–4¢ to reach an even dollar amount of coins, the computer program ignores this and instead begins to prompt the operator to add a specified number of bills to meet target values for the bills. Although this routine may result in a cash drawer being as much as 4¢ short of its total target dollar value, it saves labor with a limited loss in accuracy.

A third routine is similar to the above, except the computer program does not require the operator to add any coins to reach an even dollar amount. For example, if the cash drawer needs to receive an additional 1¢–99¢ to reach an even dollar amount of coins, the computer program ignores this and instead begins to prompt the operator to add a specified number of bills to meet target values for the bills. Once again, although this reduces the accuracy somewhat (by as much as 99¢), it reduces labor requirements.

A fourth routine only requires an operator to add quarters to come as close as possible to an even dollar total value for the cash drawer. For example, if 1¢–25¢ are needed to reach an even dollar value for the cash drawer, the computer 12 prompts the operator to add one quarter. If the cash drawer requires 26¢–50¢, the computer 12 prompts the operator to add two quarters. If the cash drawer requires 51¢–75¢, the computer 12 prompts the operator to add three quarters. If 76¢–99¢ are needed to complete the cash drawer, the computer 12 prompts the operator to add an additional dollar bill to the cash drawer. In all of these cases, the cash drawer will never be any more than 24¢ over an even dollar target value for the cash drawer.

Although the second, third and fourth routines described above will often result in the construction of cash drawers not equaling the selected total target dollar value and will result in different cash drawers having different total dollar values, labor requirements will be reduced.

At this point, the first cash drawer has been successfully balanced and the second cash drawer has been constructed so that it may be used by a cashier in a new shift. The operator is then prompted to remove the completed cash drawer from the scale. When interfaced to the POS system 20, all balancing information is automatically transmitted back to the POS system 20. The computer program stores all information relating to the first cash drawer such as the amounts of all the different types or fields of revenue removed from the first cash drawer. The computer program also stores all information relating to the second cash drawer such as the amount of revenue and quantities of denominations of revenue added to the second cash drawer.

The computer program also permits an operator to print various reports or tickets relating to cash drawers and cashiers. For example, a Current Cashier List report that shows the sign-on and sign-off times for all cashiers tracked by the computer program may be generated and printed This report includes the date and time each cashier signed on and signed off, the cashier number for each cashier, and the total "called for" amounts for the cashiers.

A Cashier Balance report provides a complete balance record for a cashier after the cashier's cash drawer has been balanced. The report includes a complete inventory of the cash drawer contents, the total amount of revenue contained in the drawer, the starting amount in the cash drawer, the difference between the final amount of revenue and the starting amount of revenue, a comparison of the actual revenue amount versus the "called for" amounts for each revenue type or field, the final balance for the cash drawer, the total for all revenue types for the cash drawer, the weekly overs or shorts (O/S) indicating the cashier's balances for the week, a summary of the actual revenues in the cash drawer for each media type, and a total of all the actual amounts for the various revenue types.

A New Till Configuration report may be produced after a new cash drawer has been successfully constructed. This report shows the various denominations of revenue in the constructed cash drawer with unit counts and the total dollar amounts of each of the denominations. This report or ticket is preferably placed in the cash drawer before the cash drawer is used by a cashier, allowing the cashier or other person to verify the contents in less than one minute.

A Checks List report lists all of the checks that were accounted for in a cash drawer balancing routine. This report should be generated after each cash drawer that includes check balances. The report includes a count of the number of checks encoded, a sequence number for each check, and the total amount of all of the checks.

A Credit/Debit Cards List report provides a printout of all credit/debit card transactions. This report is typically produced after balancing a cash drawer that contains credit/debit card receipts.

A Checks Batch List report provides a printout showing the amount of each check in the current batch and the total amount of all checks. This report is typically produced after the batch has been ended and typically accompanies the check deposit to the bank.

The computer program may also generate and print other reports including Current Cashier Balance, Help File, Check Batch Receipt, Credit Card Sub-Batch Ticket, Credit Card List, Missing Items, Credit Card Search, Pickup Cashier Balance, Loan Cashier Balance, Balance Correction, Safe Countdown, Cash In, Cash Out, Current Inventory, Daily Cashier Short/Long report, Media Totals, Weekly Cashier Short/Long, Daily Transaction log, FTP Error report, Accounts Set-Up, Denominations Set-Up, Systems Set-Up, and Closing Flags.

The computer program also has the ability to provide a "perpetual cash inventory" of all denominations of cash within a cash office of a store. The computer program and computer equipment 10 may be used to count the entire contents of a store safe, all cash drawers, and all starting till amounts to establish a base line inventory of all cash and related financial media in the store. As revenue is counted throughout the day, the inventory is updated. This permits cash deposits to be counted, by media, as part of bank deposits to decrease the inventory count of each denomination. Likewise, cash deliveries from a bank can be verified upon receipt to automatically update the inventory counts. By following these procedures, a store can maintain a running perpetual inventory of all revenue denominations. Then, by recounting the safe, cash drawers, and starting tills, the store can verify this inventory and post over/short balances.

By using this inventory data as well as a database of historical data, the computer program may also determine what an order for currency should be from a financial institution. This feature allows retailers to decrease working capital and increases their efficiency in ordering only an amount of currency which is necessary for operations until the next shipment of currency arrives.

The computer program and computer equipment 10 may also track "loose" bills in a cash drawer and identify the number of additional loose bills needed to form a pack or clip of bills (typically 25 or 100 bills). As proceeds are removed from cash drawers, packs or clips can be built immediately. This eliminates the need to later recount loose bills in cash drawers to create clips or packs for transfer to a safe or for bank deposits.

The computer program and computer equipment 10 may also be used to verify vendor coupons, store coupons, or any other type of coupon. The weigh scale 14 may be used to verify all coupons for any cashier. Deviations outside of an acceptable range of the number of coupons versus programmable weight to value comparison will trigger an itemization list to appear whereby the operator must balance the coupons individually for the current till. This routine eliminates the need to balance all cashier coupons by pinpointing possible stuffing of coupons on a per till basis.

The computer program and computer equipment 10 may also be used for tracking credit card receipts. If the computer 12 is interfaced to the POS system 20, the computer program can store information about each credit card transaction, cashier number, an account number, the total amount of the transaction, the transaction number from the POS, the date, the time of day, and a unique five-digit number assigned by the computer program for identifying a stack of credit card receipts from a cash drawer being balanced. The above information can be retrieved at a future date if needed to locate an original credit card transaction slip if it is needed to prove a customer's signature on the transaction slip.

To perform such a credit card transaction slip search, an operator may type in certain of the above items of information into the computer 12. A software routine then searches all files and responds with the unique five-digit number which corresponds to the entered information. With the five-digit number, an operator may quickly locate all transaction slips from a particular cash till and then find the desired transaction slip. This feature makes recovery time of contested credit card transactions approximately two minutes instead of an average time of two hours, if found at all.

If a copy of the original customer signed credit card slip cannot be produced on contested charges within a few days of the notice from the credit card company, the retailer's account is automatically debited the entire amount of the sale. The volume of credit card transactions continues to increase weekly. As more consumers become aware of retailers' inability to timely produce the original signed copy of the transaction, it can be expected that the volume of contested charges will increase dramatically. A dishonest consumer who manages to take advantage of a careless cashier and leave a store with a signed copy of the credit card slip knows this retailer cannot produce their signature when contested, making their entire purchase free. This scam could grow to unbelievable proportions if dishonest cashiers become an active part of the process. The term "sweethearting" in retail is when a cashier either charges a friend or relative less than an item's price or does not charge anything for an item or items. The above described scam is the ultimate in sweethearting. To compound the problem, credit card transactions are processed and electronically transmitted to the credit card companies at the time of the purchase, creating a lapse time of a few days or weeks before the retailer is notified to produce the customer's signature.

In an attempt to control this problem, the program also tracks, by cashier, all missing signed credit card slips, printing them on the unique 5-digit numbered slip created by the system's printer 18 and storing the information on the hard drive of the computer 12. This and all information stored is retrievable for a period of six months, or longer if the customer desires. If the setting is six months, the system automatically drops the first day of the six month period and adds today's information to the files. Managers can be notified of these situations as they take place, not weeks later.

The computer program and computer equipment 10 may also be used to create log files of operator and cashier activity and use these log files to provide meaningful reports to managers. The reports may be used to identify places where more training is needed in order to ensure corporate-wide consistency in daily operations. The reports may be directly transmitted to corporate managers and may be as specific as identifying every key stroke pressed by an operator or cashier or the report may be as general as providing summarizing data.

The present invention provides numerous benefits and advantages. For example, because the computer program of the present invention automates the reconciliation and balancing of cash drawers, and provides prompts to operators during these procedures, operators never get lost or need to start over when returning to complete a till balance after they have been interrupted. This essentially eliminates lost labor due to interruptions and dramatically reduces the time required to balance a cash drawer.

Another advantage is that the invention eliminates the mixing of cashier funds with store funds until a satisfactory balance of a cash drawer has been accomplished. This significantly reduces errors associated with such revenue mixing.

The invention also provides a consistent routine for all personnel that use the system, whether the personnel are in a particular store or at various stores owned by the same company. This simplifies training and dramatically increases productivity. Notwithstanding this consistency, daily and weekly closing procedures can be customizable for each store and performed automatically by utilizing options on the main menu screen.

Another advantage is that for the first time in the history of balancing cash drawers/tills, the invention allows a retailer a cost-effective way to balance cashiers' revenues each time they go on a break or a lunch break as well as at the end of their shift. What makes this process possible is the computer program's systematic step-by-step method of processing and accounting for all the multiple types of revenue which can be present in a cashier's cash drawer. This extremely fast and accurate method of balancing cash drawers, and at the same time building or constructing new cash drawers for cashiers who need a "fresh till" when starting a shift or returning from a break, provides each cashier the correct quantities of each denomination to process customers' purchases for the next 2 to 3 hours without interruptions. This process effectively eliminates the need for pick-ups, loans, and/or purchasing additional change because the cashier's "fresh till" provides adequate change making ability until their next break.

The benefits of such rapid and accurate balancing and reconciliation routines are many. One important benefit is that a store may provide all of its cashiers "fresh tills" every 2 to 3 hours. Historically, retailers by necessity must repeatedly perform pick-ups (the removal of excess cash for security reasons), loans (additional cash quantities needed to continue to make change), and/or cashier's purchase of additional change. The present invention can effectively eliminate these three requirements. Pick-ups, loans, and purchasing change steps each require the involvement of two to three employees: a cashier, a front-end supervisor, and in most operations, a cash office person or a customer service person. Providing each cashier a "fresh till" every two to three hours can eliminate all three of the employees' labor currently being invested in pick-ups, loans, and change purchases. The invention also more quickly processes required pick-ups and loans. Customer service is also greatly improved as customers no longer must wait in line for a supervisor to bring a cashier needed change to continue checking out purchases.

Another benefit of balancing cash drawers every two to three hours is the attainment of cash control each time a cash drawer is balanced. This provides management the ability to discuss shortages or policy and procedure requirements with each cashier normally when they return from their break.

Another benefit of the present invention is that stores can construct and/or replenish cash drawers with loose coins rather than rolled coins, thus saving the expense and labor associated with rolled coins.

Although the invention has been described with reference to the preferred embodiment illustrated in the attached drawing figures, it is noted that equivalents may be employed and substitutions made herein without departing from the scope of the invention as recited in the claims. For example, although the computer program of the present invention is preferably used with a computer 12 coupled to a POS system 20, "called for" amounts and target amounts may be directly entered into the computer 12. Similarly, although the preferred computer program counts revenue based on the weight of revenue, the revenue can also be manually counted and then manually entered into the computer 12 via a keyboard or other input device 22.

Having thus described the preferred embodiment of the invention, what is claimed as new and desired to be protected by Letters Patent includes the following:

What is claimed is:

1. A method of constructing a new cash drawer using, at least in part, a coin inventory of at least two different coin denominations, the method comprising the steps of:

(a) receiving and storing an input regarding an initial number of each of the different coin denominations in the coin inventory;

(b) prompting a user to place the new cash drawer on a scale;

(c) prompting the user to remove coins of a particular coin denomination from the coin inventory and deposit the coins into the new cash drawer;

(d) determining automatically, based on a weight of the coins deposited into the new cash drawer, a total number of the coins of the particular denomination deposited into the new cash drawer;

(e) updating automatically the stored initial number of coins in the coin inventory in light of the coins removed therefrom in step (c);

(f) determining automatically, based on a pre-established target number of coins of the particular denomination, any deficiency in the total number of the coins of the particular denomination in the new cash drawer;

(g) correcting the deficiency determined in step (f) by repeating steps (c) through (f); and (h) repeating steps (c) through (g) for each of the different coin denominations.

2. The method as set forth in claim 1, wherein step (g) is performed only if the deficiency exceeds a pre-established threshold value.

* * * * *

UNITED STATES PATENT AND TRADEMARK OFFICE
CERTIFICATE OF CORRECTION

PATENT NO. : 6,896,177 B2
APPLICATION NO. : 09/832509
DATED : May 24, 2005
INVENTOR(S) : Odie Kenneth Carter It is certified that error appears in the above-identified patent and that said Letters Patent is hereby corrected as shown below:

Title page, item Notice: Team Patent Adjustment should read -- 588 days instead of 476 days --.

Signed and Sealed this

Twenty-seventh Day of February, 2007

JON W. DUDAS
*Director of the United States Patent and Trademark Office*